(12) United States Patent
Selvarajah

(10) Patent No.: US 11,052,785 B2
(45) Date of Patent: Jul. 6, 2021

(54) SEATING ARRANGEMENT OF AN AUTONOMOUS AUTOMOBILE

(71) Applicant: Ramprasadh Selvarajah, Milan (IT)

(72) Inventor: Ramprasadh Selvarajah, Milan (IT)

( * ) Notice: Subject to any disclaimer, the term of this patent is extended or adjusted under 35 U.S.C. 154(b) by 0 days.

(21) Appl. No.: 15/846,374

(22) Filed: Dec. 19, 2017

(65) Prior Publication Data

US 2019/0184856 A1    Jun. 20, 2019

(51) Int. Cl.
*B60N 2/01* (2006.01)
*B60N 2/02* (2006.01)

(52) U.S. Cl.
CPC ........... *B60N 2/012* (2013.01); *B60N 2/0284* (2013.01)

(58) Field of Classification Search
CPC ............................. B60N 2/012; B60N 2/0284
See application file for complete search history.

(56) References Cited

U.S. PATENT DOCUMENTS

| | | | | |
|---|---|---|---|---|
| 190,169 A * | 5/1877 | Taylor | ..................... | A47C 1/124 297/249 |
| 2,551,207 A * | 5/1951 | Ensor | ........................ | B60P 3/34 296/172 |
| 2,991,488 A * | 7/1961 | Le Cron, Sr. | ........... | B63C 13/00 114/344 |
| 3,002,787 A * | 10/1961 | Ziegenfuss | ............ | A47C 1/124 297/249 |
| 3,408,068 A * | 10/1968 | Winton | ..................... | A63G 1/34 472/37 |
| 3,603,583 A * | 9/1971 | Bartlett | ..................... | A63G 1/30 472/39 |
| 3,700,279 A * | 10/1972 | Reineman | ................ | A47C 5/12 297/232 |
| 3,706,471 A * | 12/1972 | Shimosawa | ............ | A47B 83/02 297/158.1 |
| 4,516,943 A * | 5/1985 | Spieldiener | ............. | B63B 1/041 114/123 |
| 5,033,567 A * | 7/1991 | Washburn | ................ | B60P 3/42 180/89.12 |
| 5,318,340 A * | 6/1994 | Henry | ..................... | A47C 15/00 297/217.3 |
| 5,333,818 A * | 8/1994 | Brandt | ................... | B64D 11/06 244/118.6 |
| D368,760 S * | 4/1996 | Ullrich | ......................... | D21/830 |

(Continued)

OTHER PUBLICATIONS https://disney.fandom.com/wiki/Mad_Tea_Party Spinning Tea Cup opening date Jul. 17, 1955 (Year: 1955).*

(Continued)

*Primary Examiner* — Lori L Lyjak

(57) ABSTRACT

A seating layout of an autonomous automobile, which is aligned in a roughly rounded, circular or elliptical arrangement is disclosed. The seating layout comprises of a seating area and a cabin structure to provide a unique travelling experience in terms of atmosphere and feelings for the passengers along with different aspects of travel such as comfort, safety, ergonomics, etc. The seating area and the cabin structure are aligned and assembled together in such a way that the passengers are oriented towards a common focal area. This arrangement stimulates interaction and in turn, provides a communal atmosphere to the passengers. The novelty of this layout in an autonomous automobile will result in a visually unique interior.

3 Claims, 9 Drawing Sheets

(56) References Cited

U.S. PATENT DOCUMENTS

| | | | | |
|---|---|---|---|---|
| 6,070,936 | A * | 6/2000 | Holland | A47C 1/12 297/232 |
| 6,796,398 | B1 * | 9/2004 | DeGevay | B62D 31/003 180/21 |
| 7,828,383 | B1 * | 11/2010 | Urbanek | B63B 29/06 297/344.1 |
| D674,204 | S * | 1/2013 | Rosa | D6/358 |
| D770,349 | S * | 11/2016 | Ahn | B60P 3/34 D12/195 |
| D796,403 | S * | 9/2017 | Ahn | B60N 2/06 D12/195 |
| 10,053,164 | B2 * | 8/2018 | Faruque | B60N 3/001 |
| 10,583,797 | B2 * | 3/2020 | Line | B60N 2/42 |
| 2004/0088785 | A1 * | 5/2004 | Walker | A61H 33/02 4/541.1 |
| 2007/0193123 | A1 * | 8/2007 | Magpuri | E04H 3/30 52/8 |
| 2010/0207442 | A1 * | 8/2010 | Hrib | A47C 13/005 297/440.14 |
| 2016/0138290 | A1 * | 5/2016 | Dautaj | E04H 12/182 52/67 |
| 2017/0113702 | A1 * | 4/2017 | Thieberger-Navon | B60W 50/14 |
| 2017/0174141 | A1 * | 6/2017 | Jhant | B62D 21/183 |
| 2017/0334313 | A1 * | 11/2017 | Ahn | B60N 2/2222 |
| 2018/0272977 | A1 * | 9/2018 | Szawarski | B60R 21/01512 |
| 2019/0061489 | A1 * | 2/2019 | Hoggarth | B60J 5/0479 |
| 2019/0092264 | A1 * | 3/2019 | Spahn | B60R 21/207 |
| 2019/0126787 | A1 * | 5/2019 | Line | B60N 2/06 |
| 2019/0135349 | A1 * | 5/2019 | Nusier | B60J 5/0479 |

OTHER PUBLICATIONS

Disclosures made by inventor of the Present invention shall not be considered prior art under 35 U.S.C 102(a)(2) Exceptions—(2)(C) Disclosures Appearing in Applications and Patents: Politecnico di Milano. Autonomous Cars for Inner & Inter City. TAD Masler Showcase [online and exhibit]. [retrieved on Jun. 25, 2016] Retrieved from <http://www.polidesign.net/en/TADShowcase2016>.

Disclosures made by Inventor of the Present Invention shall not be considered prior art under 35 U.S.C 102(a)(2) Exceptions (2)(C) Disclosures Appearing in Applications and Patents: Auto & Design SRI, Reinterpreting Space Auto & Design [online], [retrieved on Sep. 27, 2016] Retrieved from <http://www.autodesignmagazine.com/en/2016/09/tad-pohmi-7a-edizone-ambienh-reinterpretati>.

* cited by examiner

SEATING ARRANGEMENT OF AN AUTONOMOUS AUTOMOBILE

CROSS REFERENCE TO RELATED APPLICATIONS

Not Applicable

REFERENCES CITED

1. US 20120299327 A1 (Ian Gordon Murray) Mar. 15, 2007, page 1, abstract
2. US 20140159440 A1 (Glen Wilson Porter) Jun. 12, 2014, page 1, abstract
3. US 20070295863 A1 (James Thompson) Jun. 10, 2007, page 1, abstract

DISCLOSURES MADE BY THE INVENTOR OF THE PRESENT INVENTION SHALL NOT BE CONSIDERED PRIOR ART UNDER 35 U.S.C. 102 (A) (2) EXCEPTIONS—(2)(C) DISCLOSURES APPEARING IN APPLICATIONS AND PATENTS:

The subject matter disclosed and the claimed invention, not later than the effective filing date of the claimed invention, were owned by the same person or subject to an obligation of assignment to the same person.
1. Politecnico di Milano. Autonomous Cars for Inner & Inter City, TAD Master Showcase [online and exhibit], [retrieved on Jun. 25, 2016].
   Retrieved from <http://www.polidesign.net/en/TAD-Showcase2016>
2. Auto & Design SRL. Reinterpreting Space, Auto & Design [online], [retrieved on Sep. 27, 2016].
   Retrieved from <http://autodesignmagazine.com/en/2016/09/tad-polimi-7a-edizione-ambienti-reinterpretati/>
3. Auto & Design SRL Reinterpreting Space. Auto & Design. dis. bull. September 2016, Vol.220, page 63, ISSN 03938387.

STATEMENT OF FEDERALLY SPONSORED RESEARCH OR DEVELOPMENT

Not Applicable

THE NAMES OF THE PARTIES TO A JOINT RESEARCH AGREEMENT IF THE CLAIMED INVENTION WAS MADE AS A RESULT OF ACTIVITIES WITHIN THE SCOPE OF A JOINT RESEARCH AGREEMENT

Not Applicable

REFERENCE TO A SEQUENCE LISTING

Not Applicable

FIELD OF THE INVENTION

The present invention relates to a seating layout for an autonomous automobile, in particular comprising a seating area and a cabin structure aligned in a roughly rounded, circular or elliptical arrangement.

BACKGROUND OF THE INVENTION

Generally the layout of most of the existing automobiles limits the interaction among the passengers as they do not face each other. There are existing layouts such as the layout with opposing seats for passengers to interact with the person in front. However, these layouts do not provide a platform for equal interaction among all passengers. These layouts do not necessarily stimulate conversation and conviviality between passengers.

A new and improved layout would not just eliminate the physical barriers enforced by the existing layouts, but also stimulate interaction among all passengers. It would be a layout where it not only improves the field of vision enabling passenger interaction, but also provides closeness, freedom of orientation and the freedom to perform group activities. In order to obtain a communal experience, each individual in the community needs to have the freedom to freely interact with every other individual. There is a need for a layout, which minimizes the isolation or separation among the passengers.

Automobiles generally serve in a variety of situations such as, but not restricted to, personal, family, social and professional settings. The requirements for each situation vary. In a family setting, it could stimulate a friendly atmosphere whereas, in a professional setting, it could provide an ideal setup for meetings and discussions. A layout that would suit a variety of life situations is required.

In addition to conforming to the basic requirements of an automobile, there is an opportunity to create a layout that would bring freedom of space, activities and interaction. The freedom of space allows the passengers to be comfortable to sit in a variety of orientations with respect to the direction of travel. In addition to this, the freedom of space creates a different and unique atmosphere for passengers. The freedom of activities allows all the passengers to perform an activity with equal freedom, which would be provided by the layout. Every component, including the interior and the exterior needs to be designed in such a manner that individually provides for functionality, freedom and flexibility.

The US Application US20120299327A1 provides for a compact seating arrangement for a vehicle, the seating arrangement has at least three seats comprising two rear passenger seats aligned substantially transversely, and a driver's seat arranged substantially centrally and in front of the two rear passenger seats. The driver's seat extends transversely; to be positioned in front of part of each of the passenger seats and extends rearward beyond the front of the legs of the rear passengers (when seated in the passenger seats). Each of the seats being arranged to seat a person in a generally upright position: the seat backs being inclined to the vertical at an angle of 30 degrees or less, an upper surface which supports the occupant of each seat base being spaced 400-500 mm above a substantially horizontal floor space provided adjacent the seats, and the passengers' feet being placed on the horizontal floor space on either side of the driver's seat.

The cited prior art talks about a compact seating arrangement and has at least three seats comprising two rear passenger seats aligned substantially transversely, and a driver's seat arranged substantially centrally and in front of the two rear passenger seats. Whereas, the present invention has a roughly rounded arrangement, enables passenger interaction and has passengers oriented towards a common focal area. The present invention could also retain the compactness of the passenger automobile.

The US Application US20140159440A1 talks about a seating arrangement for location at the longitudinal centre line of a commercial passenger vehicle that has a longitudinally extending passenger seating area. The seating arrangement includes a pair of seats disposed alongside and secured to each other. Each seat comprising a backrest portion, and a seat pan portion, wherein the seats face at an acute angle to each other, and wherein the backrest portions of the respective seats are nearest the vertex of the acute angle than the seat pan portions.

The cited prior art talks about a Passenger seating in a commercial vehicle which improves the privacy by having the passengers aligned away from each other instead of having passengers shoulder to shoulder as in other existing inventions. However, the present invention has a roughly rounded arrangement and the passengers oriented towards a common focal area unlike the above-cited invention.

The US Application US20070295863A1 talks about a seating arrangement for a vehicle, especially an aircraft, in which seats are arranged in a plurality of generally parallel ranks, each rank extending in a fore-and-aft direction, and in a plurality of rows, each row extending at an angle other than a right angle with respect to said fore-and-aft direction and wherein adjacent seats in a row overlap in a transverse direction. In this embodiment, the seats of a row also overlap in said fore-and-aft direction and include a truncated armrest at one side of the seat arranged to fit behind an adjacent seat. The seats further include an armrest at the other side of the seat; the armrest comprising a bar, which extends from the rear of the seat so that a portion of one seat is located beneath the armrest provided at said other side of an adjacent seat.

The cited prior art talks about a seating arrangement for a vehicle, especially an aircraft, which provides increased leg room for passengers by aligning the passengers in parallel ranks at an angle, whereas the present invention has a roughly rounded arrangement with the passengers facing towards a common focal area, which stimulates the interaction among passengers.

It can be seen that existing inventions focus on improving the comfort of the passengers and do not focus on improving the communal atmosphere of the vehicle. There is a need to address this aspect of travel.

BRIEF SUMMARY OF THE INVENTION

The present invention relates to a seating layout and the corresponding components of an autonomous automobile. The invention brings about stimulation in interaction among the passengers.

The layout would be novel compared to existing layouts, at the same time creates a unique atmosphere during transportation.

The present invention comprises of a seating area and a cabin structure. The above-mentioned components are aligned in a roughly rounded, circular or elliptical arrangement.

The seating area provides the area for the passengers to be seated flexibly in different positions and orientations with respect to the direction of travel. It performs the functions of the seat base, where the passengers sit, and the seat back, where the passengers rest their backs. The seat base is positioned above a horizontal floor space where the passengers can rest their legs.

The seating area consists of one or multiple parts, which are aligned in a roughly rounded, circular or elliptical arrangement. The seating area has at least one discontinuity that allows the entry and exit of passengers.

The above-mentioned seating arrangement maybe mounted to a cabin structure, which may be in the form of a removable component mounted to the automobile body or a single integrated inseparable component of the automobile frame.

A removable type of cabin structure provides the physical support for the seating area and integrates it with the exterior of the automobile. This type of cabin structure provides added isolation of the interior from the rest of the automobile. It would also have at least one discontinuity dictated by the seating area so as to allow the entry and exit of the passengers.

A removable type of cabin structure allows for the possibility of removing the cabin together with the seating area to be mounted on to different automobile body types.

A cabin structure integrated with the automobile frame as a single inseparable component would comprise a space for supporting the seating area.

The components are aligned and assembled together in such a way that it creates a novel layout, which stimulates interaction and in turn, provides a communal atmosphere to the passengers.

According to the concept of form following function, this novel passenger layout could influence the exterior form of the autonomous automobile to be distinctive.

DETAILED DESCRIPTION OF THE INVENTION

Figure 12:
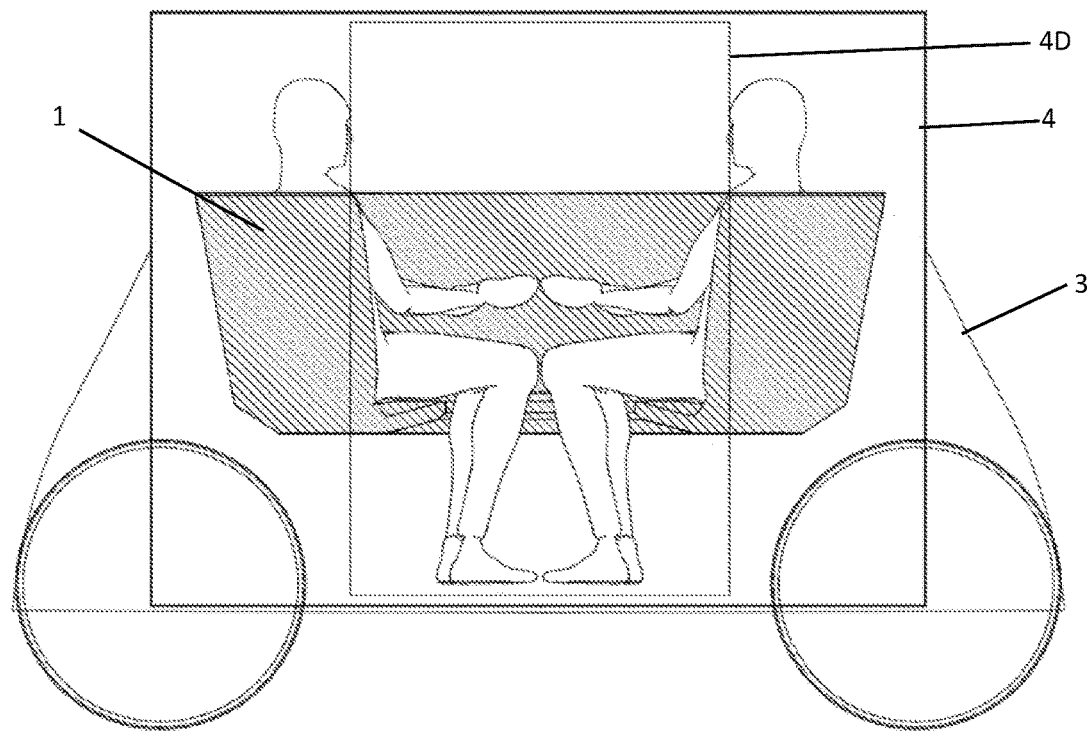
FIG. 12 is a side view of the setup of the seating area and a removable cabin structure in an autonomous automobile.
Figure 13:
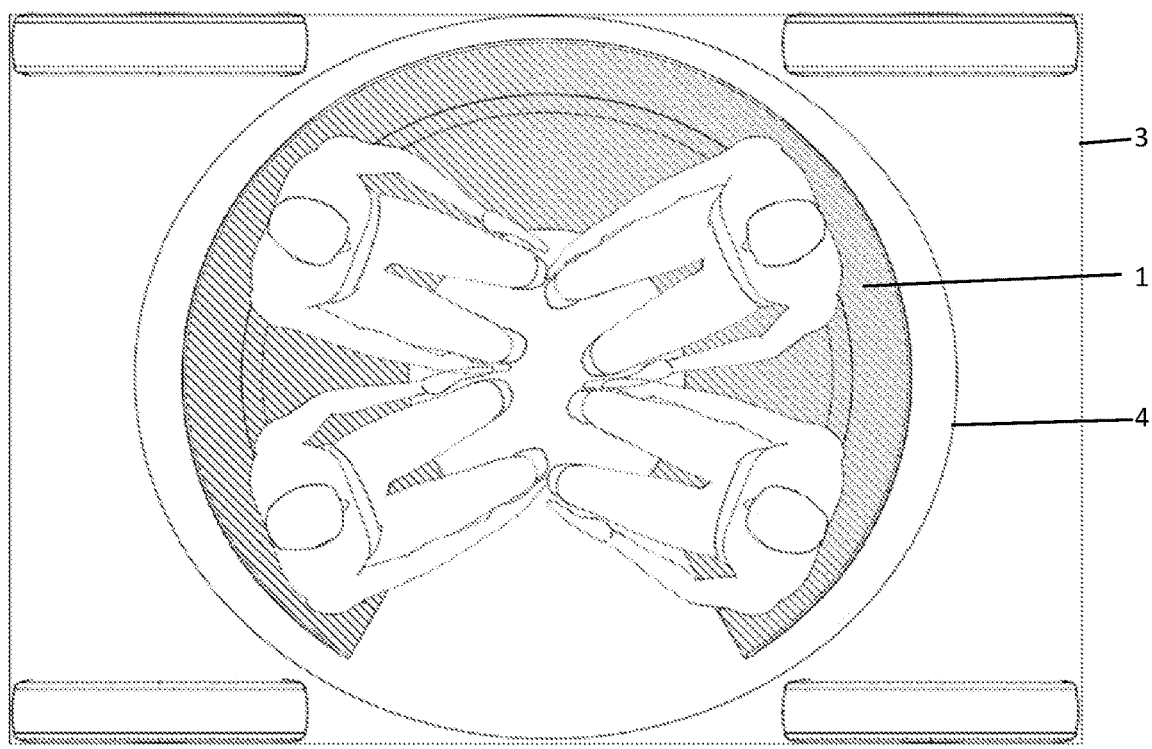
FIG. 13 is a top view of the setup of the seating area and a removable cabin structure and seating area in an autonomous automobile.
Figure 14:
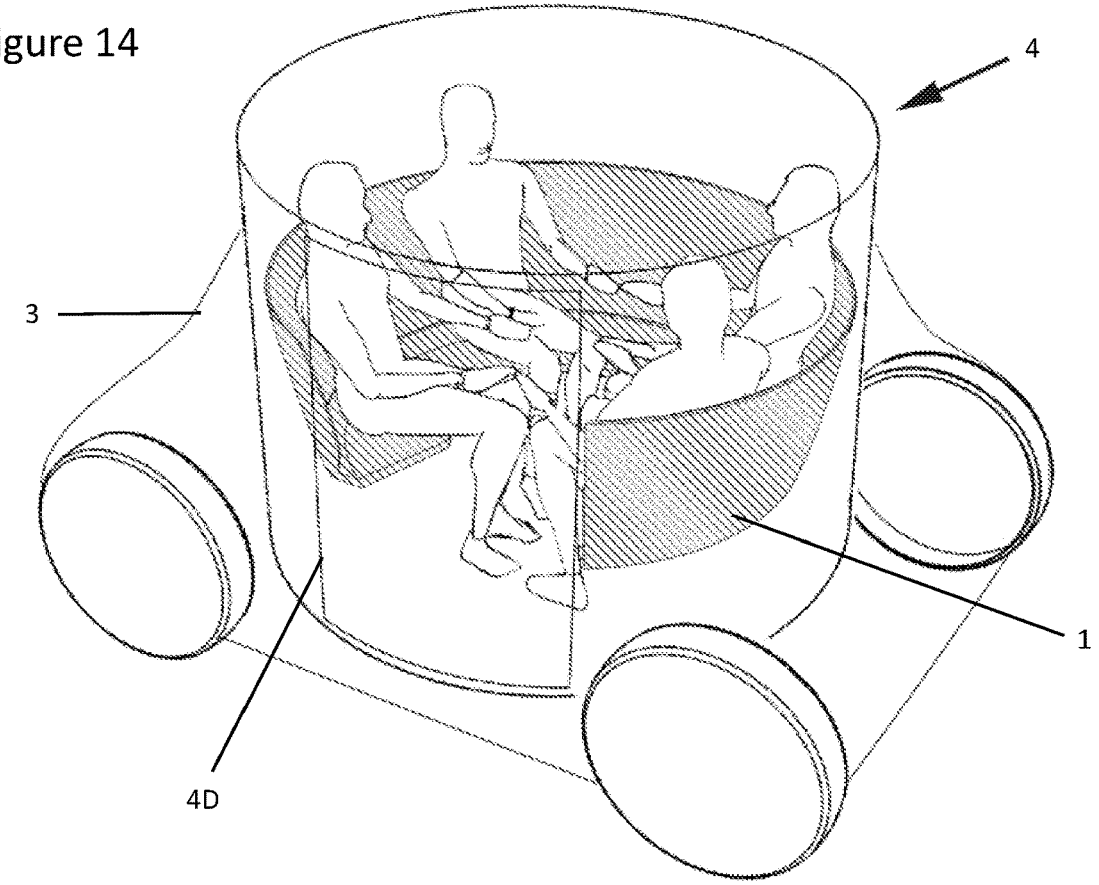
FIG. 14 is a perspective view of the setup of the seating area and a removable cabin structure and seating area in an autonomous automobile.

The invention as embodied in FIG. 9-14, comprises of the layout of an autonomous automobile, which is made up of the following components:

the seating area 1 and removable cabin structure 4 or integrated cabin structure 2 to support the said seating area The FIGS. 12-14 illustrate an example of how the invention is incorporated in an autonomous automobile. This particular example shows the seating area 1 and a removable type of cabin structure 4 with one discontinuity 4D for the entry and exit of passengers. There could be another discontinuity depending on the size and function of the vehicle without altering the seating layout significantly. The proportions of the invention and the vehicle could also vary without altering the nature and the benefits of the invention. The alignment of the seating area 1 and the cabin structure 4 in the autonomous automobile is illustrated in these figures. These figures provide an example of how multiple passengers are seated in the seating area 1 and how the layout facilitates the interaction among the passengers. The passengers are oriented towards a common focal area, which stimulates the interaction and conviviality. This adds an emotional aspect to the novelty of the layout.

The seating area 1 as shown in FIG. 1-8 consists of one or multiple parts aligned in a roughly rounded, circular or elliptical arrangement.

Figure 1:
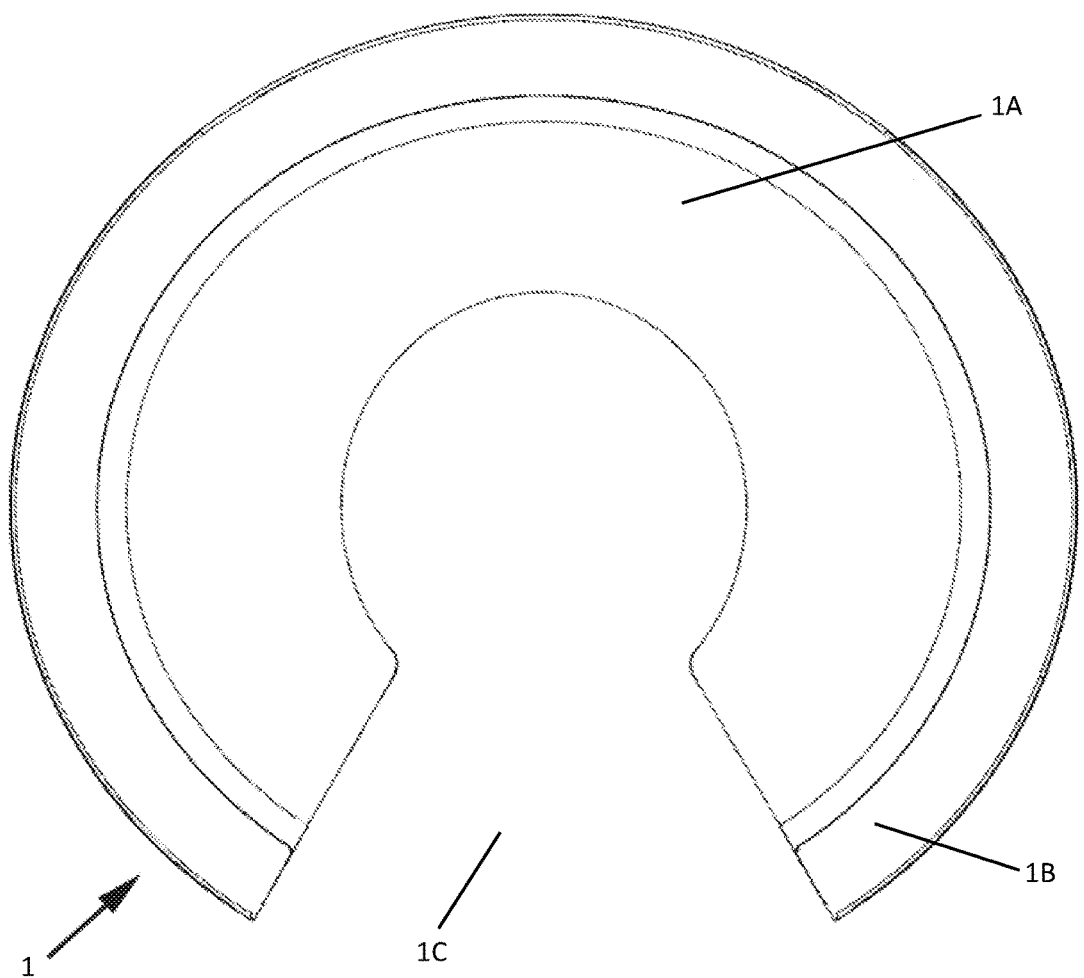
FIG. 1 is a top view of the seating area.
Figure 2:
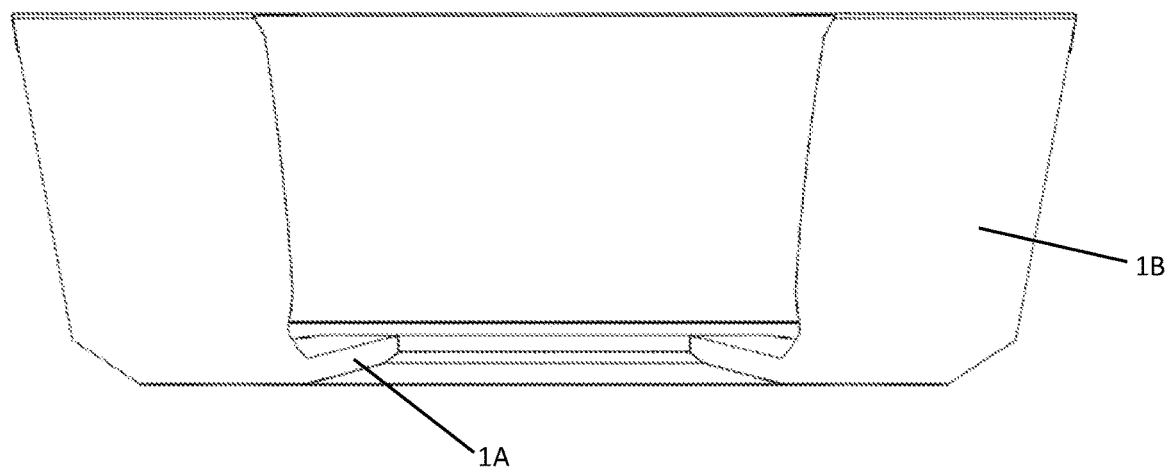
FIG. 2 is a side view of the seating area.

The FIG. 1 shows the roughly rounded layout of the seating area 1 for stimulation of interaction among the passengers in the automobile. The seating area 1 has one or two discontinuities that allow the passengers to enter and exit the automobile. The figure provides an example of a seating area 1 with one discontinuity 1C. The space in the center of the layout provides the area for the passengers to place their legs. The roughly rounded shape of the seat base 1A is illustrated in this figure. A similar effect could be produced using a circular, elliptical or rounded polygon shape. These minor changes in shape and design would not significantly alter the nature and benefits as claimed in the present invention.

Figure 7:
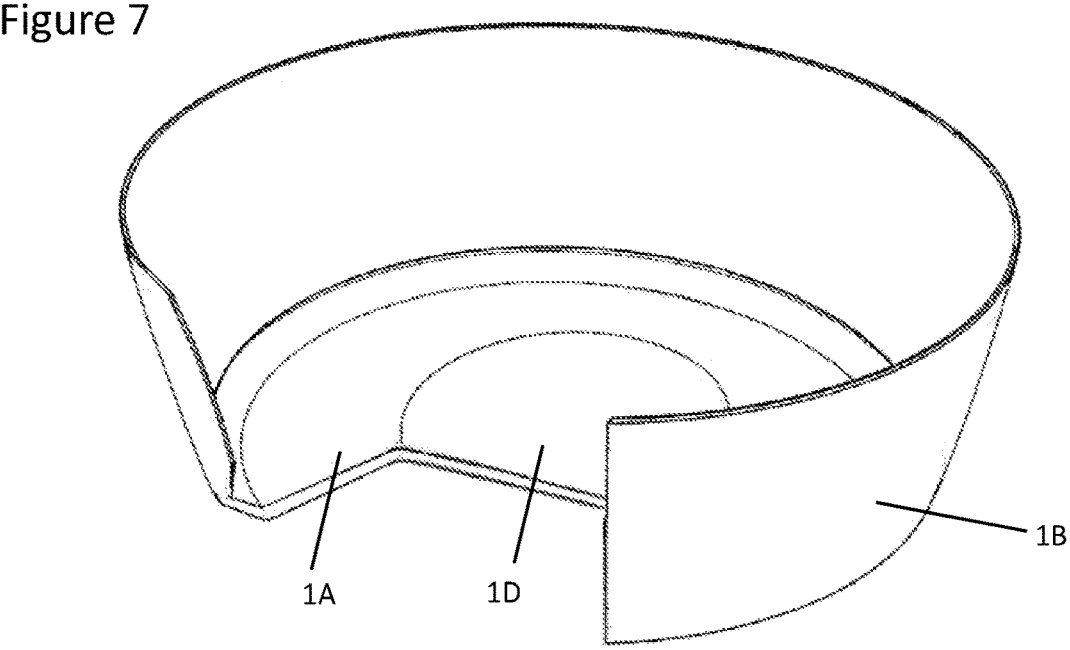
FIG. 7 is a perspective view of an example of how the seat base of the seating area is extended.
Figure 8:
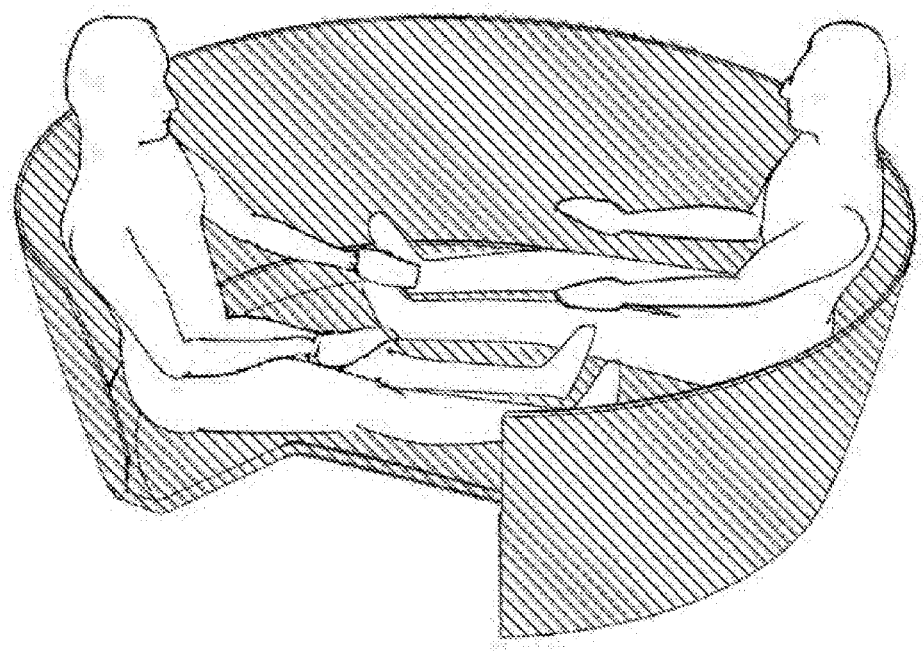
FIG. 8 is a perspective view of an example of how the passengers are seated when the seat base of the seating area is extended.

The central leg space in the seating area in FIG. 7-8 could be closed by a retractable or foldable surface 1D to create a bigger seat base surface. Such type of surface could allow for passengers to stretch the legs such as in a lounge-like arrangement. A retractable or removable seat base could also allow for the required space for a wheelchair or additional storage space. This merely improves the functionality of the layout.

Figure 3:
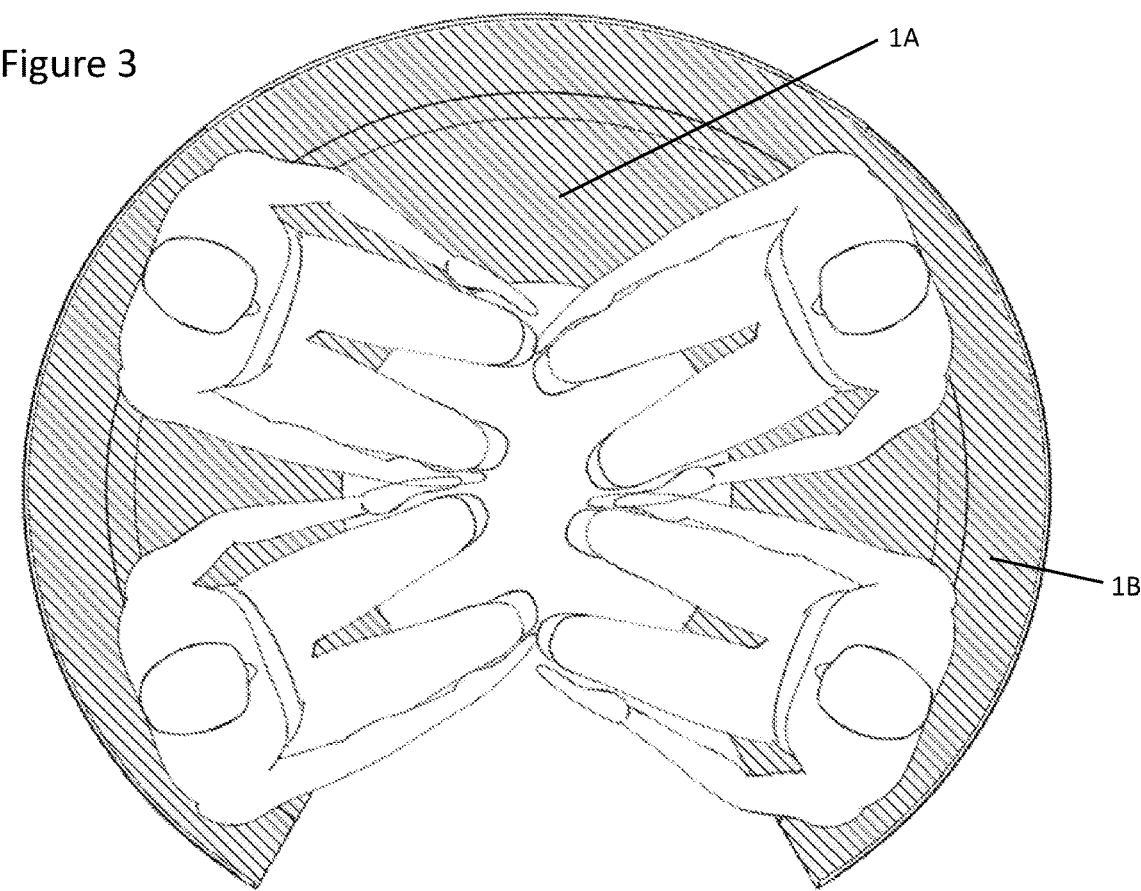
FIG. 3 is a top view of an example of how the passengers are seated in the seating area.
Figure 4:
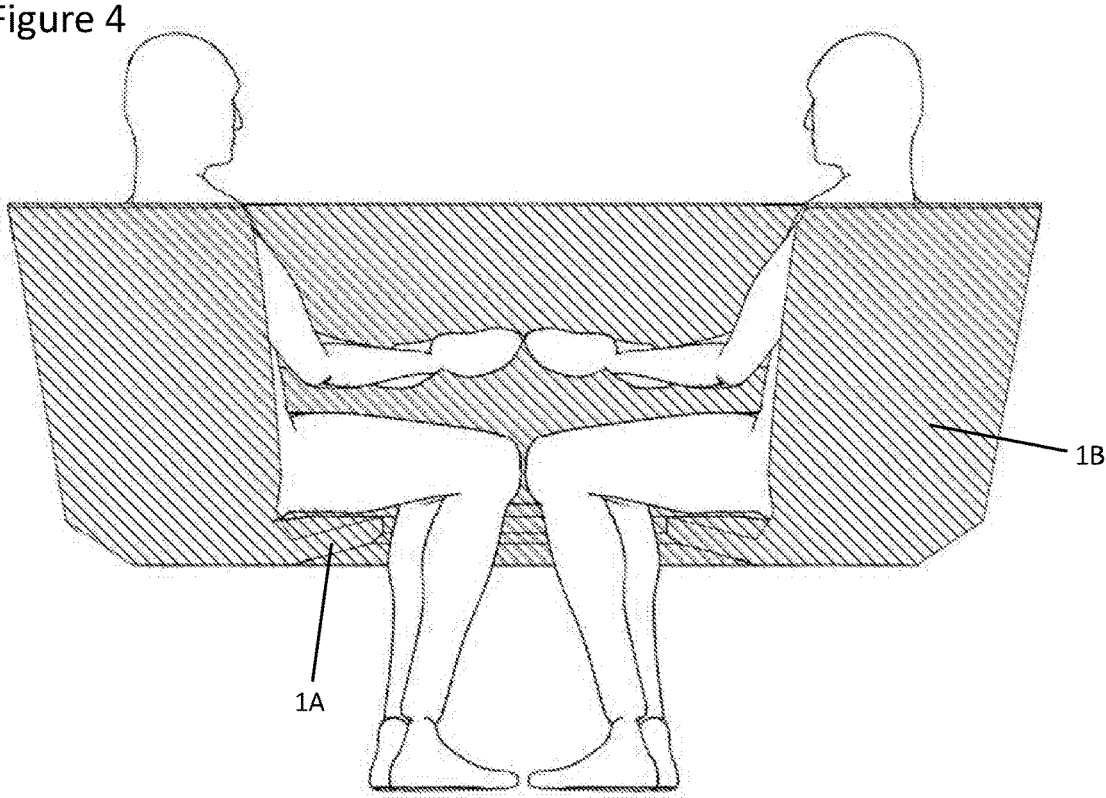
FIG. 4 is a side view of an example of how the passengers are seated in the seating area.
Figure 5:
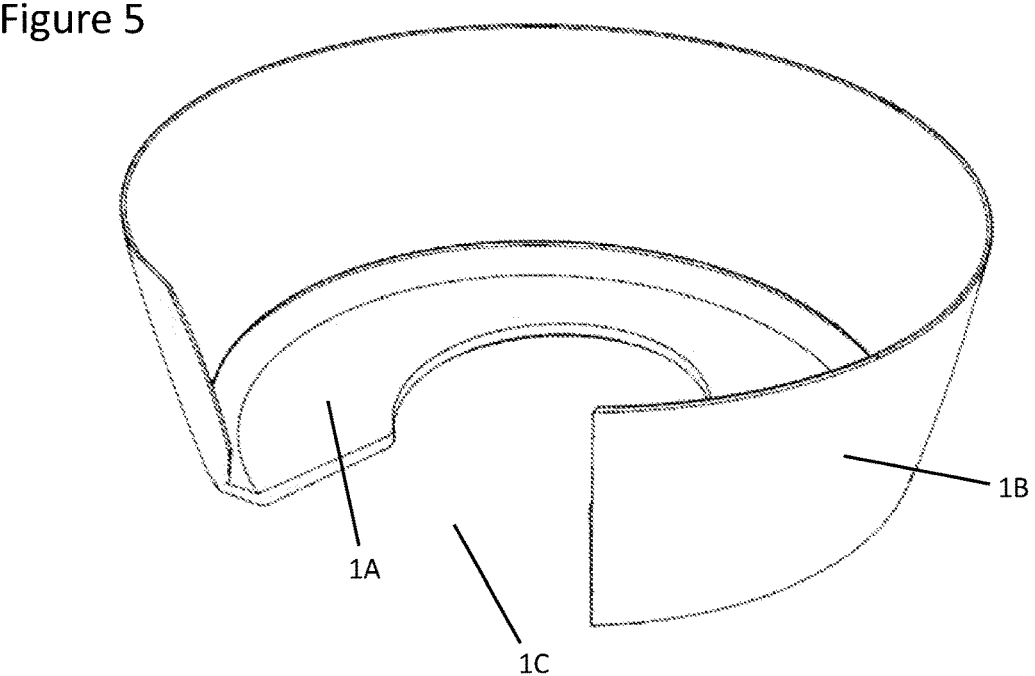
FIG. 5 is a perspective view of the seating area.
Figure 6:
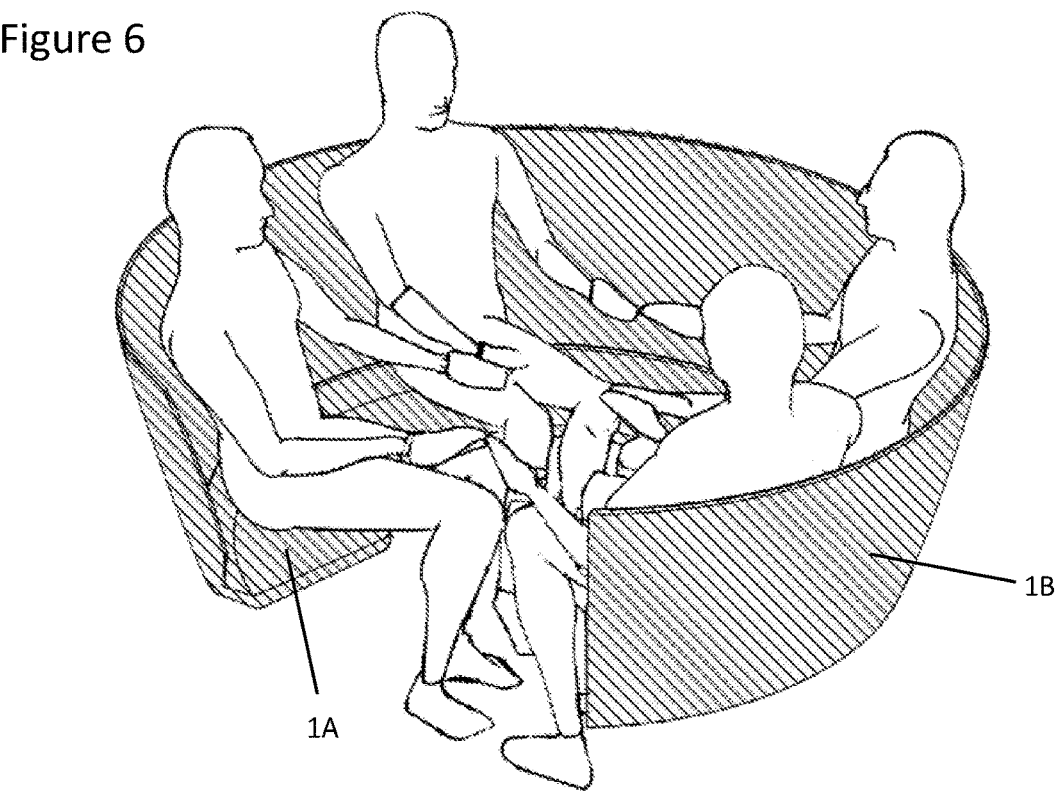
FIG. 6 is a perspective view of an example of how the passengers are seated in the seating area.

FIG. 3 shows the side view of the seating area 1. It displays the alignment of the seat back 1B in relation to the seat base 1A. The seat back 1B provides the surface for the passengers to rest their backs.

Figure 9:
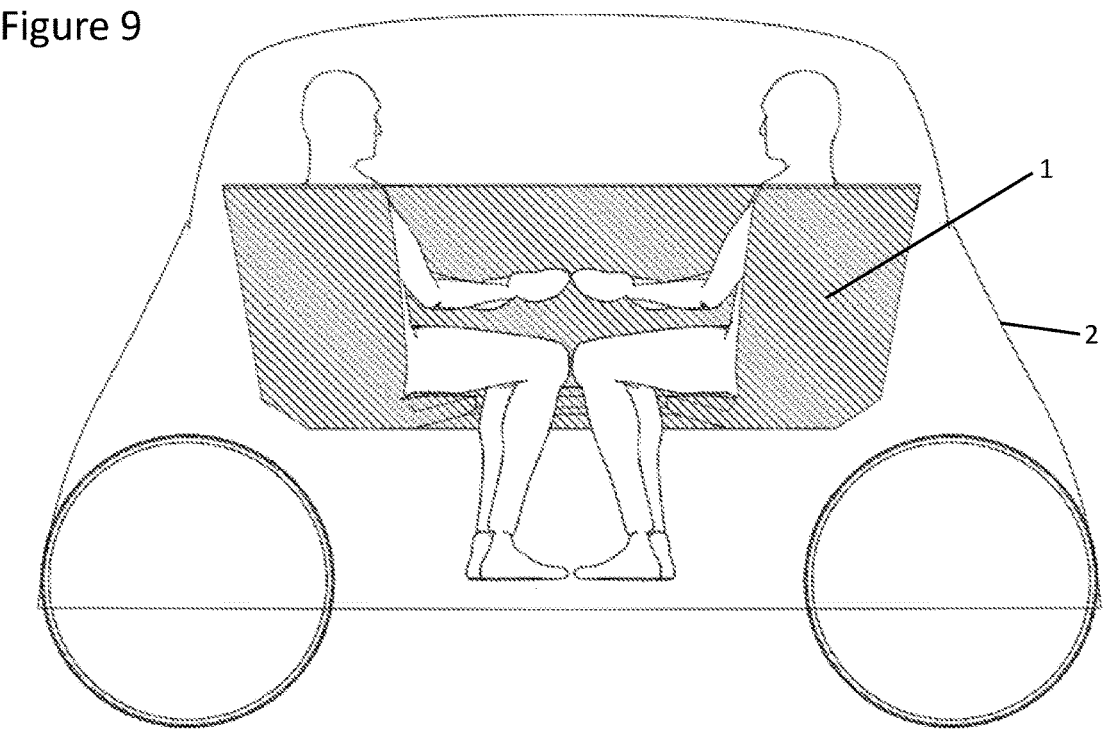
FIG. 9 is a side view of the setup of an integrated cabin structure and seating area in an autonomous automobile.
Figure 10:
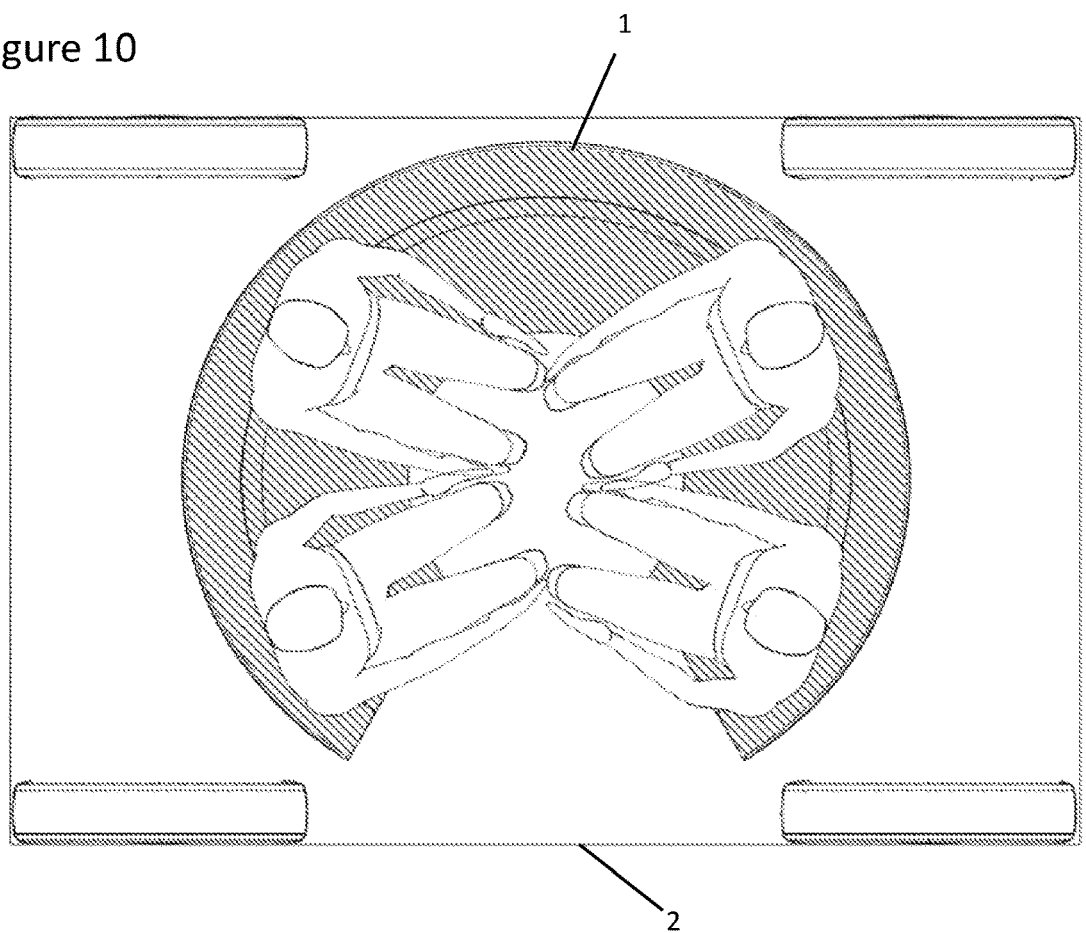
FIG. 10 is a top view of the setup of an integrated cabin structure and seating area in an autonomous automobile.
Figure 11:
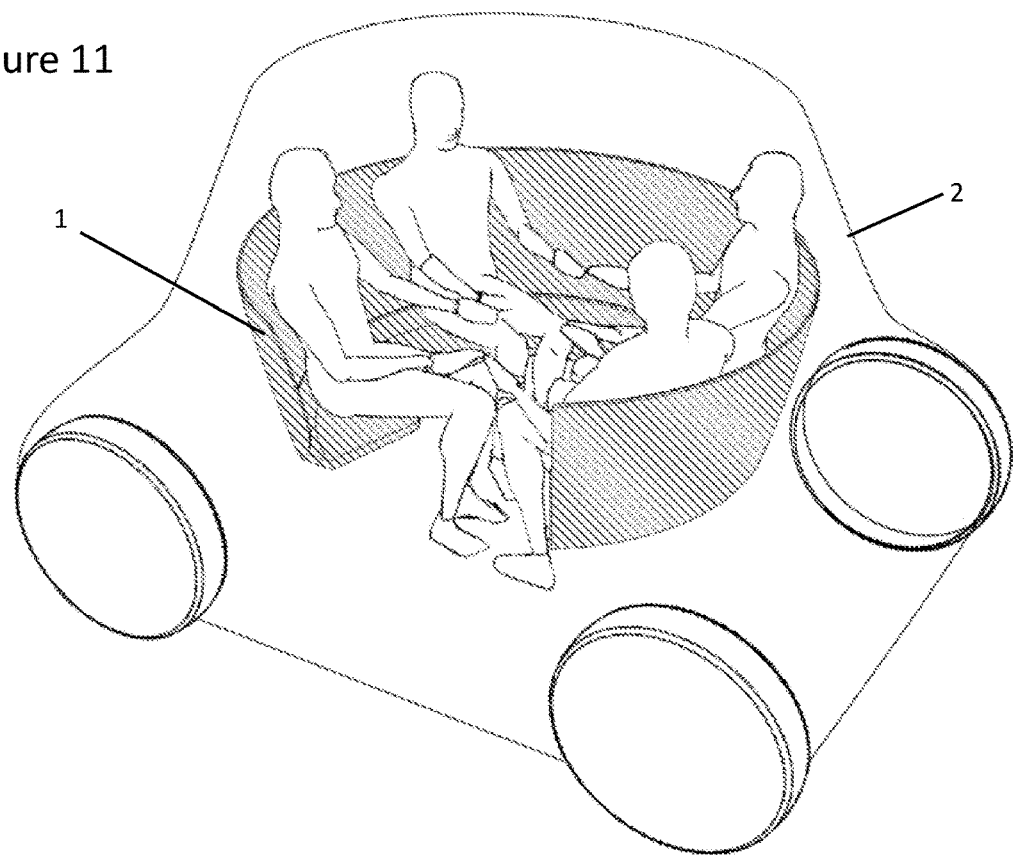
FIG. 11 is a perspective view of the setup of an integrated cabin structure and seating area in an autonomous automobile.

The cabin structure could be in the form of an integrated inseparable component of the automobile frame 2, which creates the space for the seating area 1 as illustrated in FIGS. 9-11.

As shown in FIG. 9-11, an integrated type of cabin structure 2 would comprise of a roof, floor space, a portion connecting roof and floor space and at least one discontinuity.

The integrated cabin structure 2 would support the seating area 1 of a roughly rounded, circular or elliptical arrangement and integrates it with the rest of the automobile.

The FIG. 13 shows the top view of a removable type of cabin structure 4, which is of roughly cylindrical form. The figure illustrates the roughly rounded shape of the layout in the present invention. The removable cabin structure 4 follows a similar shape as that of the seating area 1. A similar effect of a cylindrical cabin structure could be produced by an extrusion of roughly circular, elliptical or rounded polygon shape. These minor changes in shape and design would not significantly alter the functions served by the cabin structure 4 in the present invention.

Figure 15:
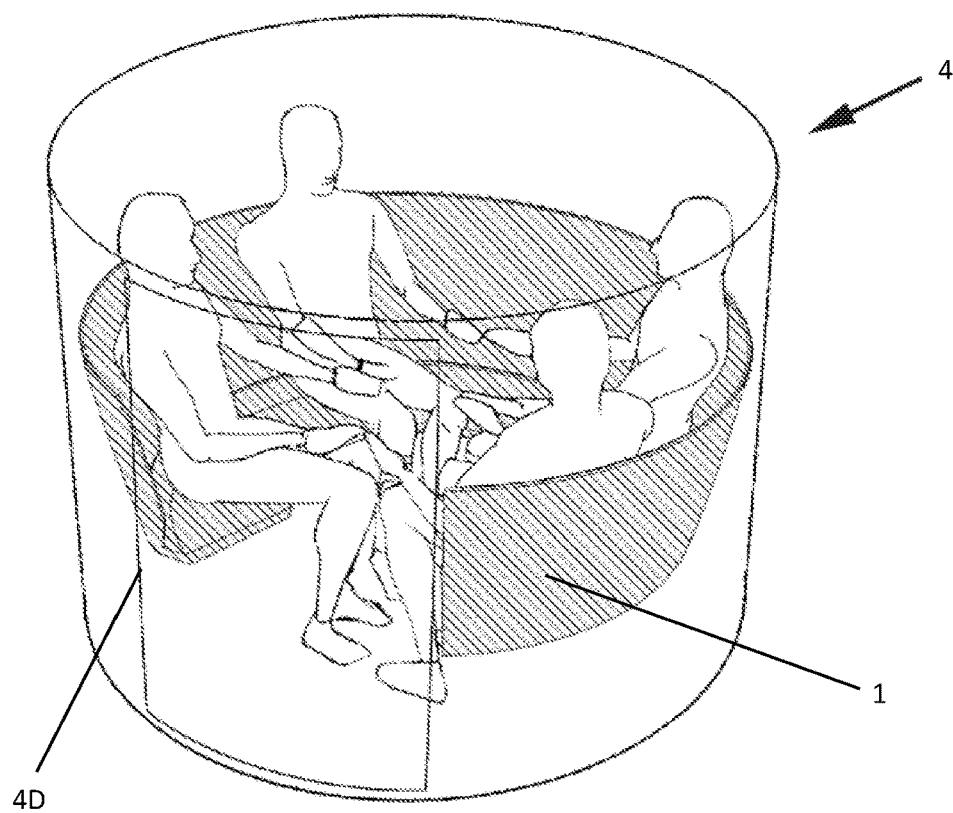
FIG. 15 is a perspective view of the setup of the seating area and a removable cabin structure.
Figure 16:
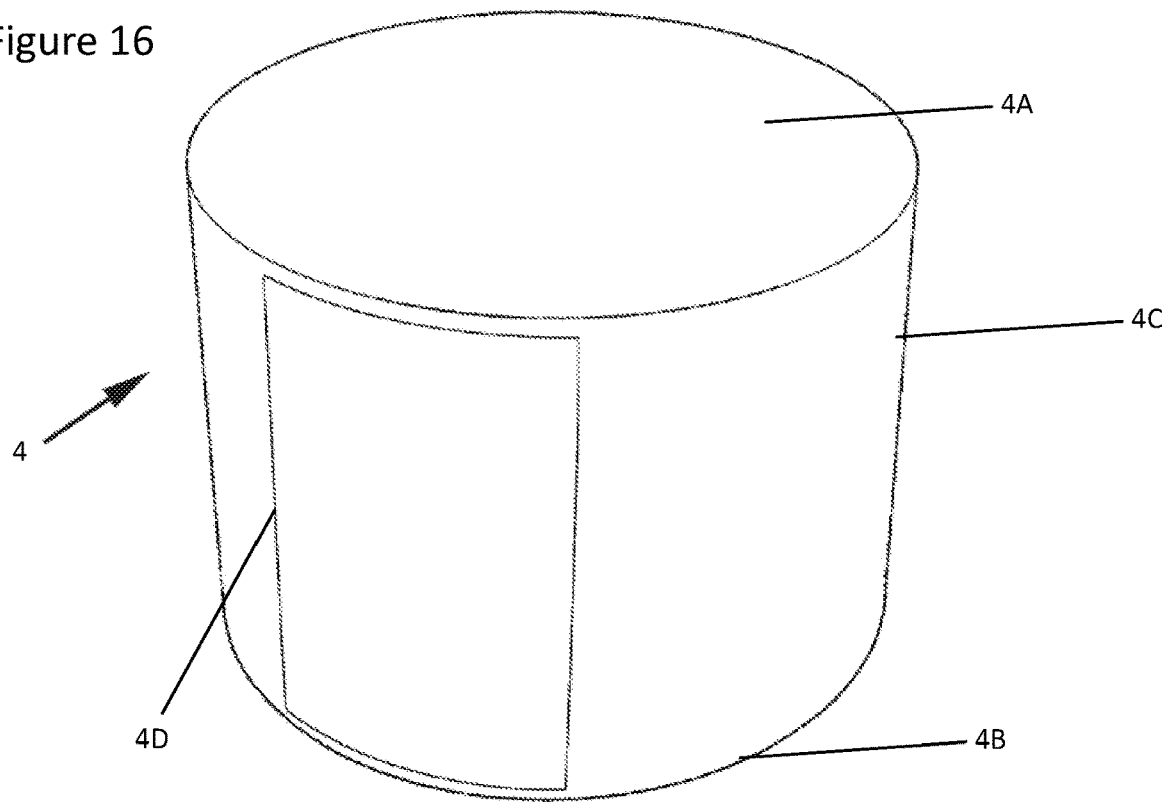
FIG. 16 is a perspective view of the removable cabin structure.
Figure 17:
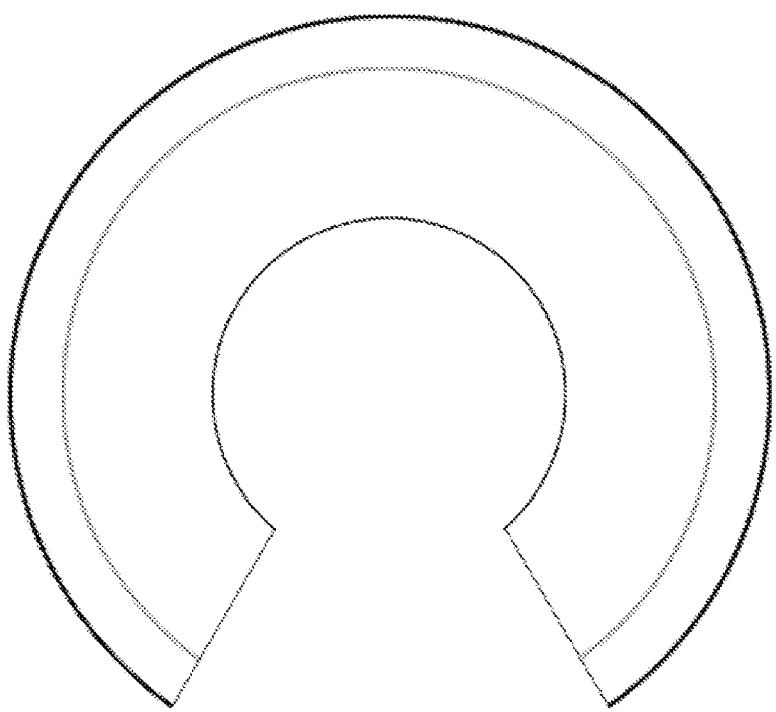
FIG. 17 is an example of the top view of a circular seating area.
Figure 18:
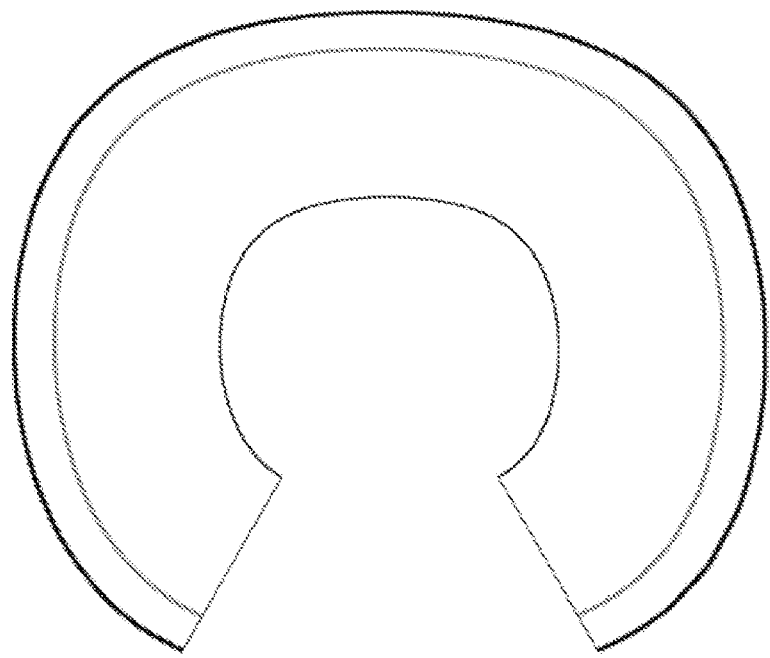
FIG. 18 is an example of the top view of a rounded polygon seating area.

FIG. 15 shows a removable type of cabin structure 4 comprising of a roof 4A, a floor space 4B, a portion connecting roof and floor space 4C and at least one discontinuity 4D. The roof 4A forms the top surface of the cabin structure 4. The portion connecting the roof and floor space 4C is in the form of a roughly cylindrical wall, which follows a similar shape as that of the seating area 1. The inner wall of the cabin structure 4C supports the seating area 1 and the outer wall is integrated with the rest of the automobile 3. The floor of the cabin structure 4B provides the space for the passengers to rest their legs. There could be another discontinuity serving as another entry and exit. However, these changes in form and detail and complementary additions do not alter the functions of the cabin structure 4 in the present invention.

The setup of the seating area 1 and a removable cabin structure 4 in an autonomous automobile is shown in FIG. 12-14. As can be seen in FIG. 14, the layout provides a setting where the passengers are oriented towards a common area of focus. It is also evident that a bench-type seating arrangement of the present invention provides more flexibility than individual seats present in a conventional automobile due to the lesser number of discontinuities in the seating area 1.

As may be seen from FIG. 15, the setup is capable of being a standalone assembly, which can then be assembled with different automobile body styles.

The invention claimed is:

1. A seating layout in an autonomous automobile comprising:
    a continuous seating area for passengers aligned in an approximately rounded arrangement, said continuous seating area comprising a semi-circle seat back extending from a semi-circle seat base, and at least one discontinuity defined by the seat back and seat base, wherein the continuous seating area is constructed and arranged to orient seated passengers toward a shared area of focus and wherein the continuous seating area is constructed and arranged for more than one passengers to be seated;
    a cabin structure supporting the continuous seating area comprising a roof, floor space, a portion connecting the roof and the floor space and at least one second discontinuity; and
    at least one retractable part to increase or decrease the area of the seat base as needed.

2. The seating layout in an autonomous automobile as claimed in claim 1, wherein the cabin structure is fabricated as an inseparable structure integrated with the structural frame of an automobile.

3. The seating layout in an autonomous automobile as claimed in claim 1, wherein the cabin structure is fabricated as a removable cabin structure.

* * * * *